US009580205B1

(12) United States Patent
Gabrys

(10) Patent No.: US 9,580,205 B1
(45) Date of Patent: Feb. 28, 2017

(54) CORRUGATED PALLET SHIPPING METHOD

(71) Applicant: Christopher W. Gabrys, Reno, NV (US)

(72) Inventor: Christopher W. Gabrys, Reno, NV (US)

(73) Assignee: Lifdek Corporation, Reno, NV (US)

( * ) Notice: Subject to any disclaimer, the term of this patent is extended or adjusted under 35 U.S.C. 154(b) by 340 days.

(21) Appl. No.: 13/986,841

(22) Filed: Jun. 10, 2013

Related U.S. Application Data

(63) Continuation-in-part of application No. PCT/US2013/000137, filed on May 20, 2013.

(60) Provisional application No. 61/665,358, filed on Jun. 28, 2012, provisional application No. 61/664,827, filed on Jun. 27, 2012, provisional application No. 61/823,380, filed on May 14, 2013.

(51) Int. Cl.

| | |
|---|---|
| ***G06Q 10/08*** | (2012.01) |
| ***B31B 1/26*** | (2006.01) |
| ***B31B 11/00*** | (2006.01) |
| ***B65D 19/00*** | (2006.01) |

(52) U.S. Cl.
CPC ............ *B65D 19/0004* (2013.01); *B31B 1/26* (2013.01); *B31B 11/00* (2013.01)

(58) Field of Classification Search
CPC ................ G06Q 10/08; B65D 19/0004; B65D 2519/00019; B65D 2519/00054; B31B 1/26; B31B 11/00
USPC ....... 493/162, 194, 199, 480, 916, 936, 964, 493/127, 79, 68; 229/117; 108/51.3; 53/456, 429, 410
See application file for complete search history.

(56) References Cited

U.S. PATENT DOCUMENTS 2,709,559 A 5/1955 Geisler
2,856,826 A * 10/1958 Norquist .................. B31D 5/00 493/417
2,908,464 A 10/1959 Traudt et al.
3,770,142 A * 11/1973 Zernov .................. B65H 29/60 414/790.3
3,889,580 A * 6/1975 Garst ................. B65D 5/48034 493/30
3,952,672 A 4/1976 Gordon et al.
4,117,646 A * 10/1978 James ................... B65B 7/2871 53/287

(Continued)

*Primary Examiner* — Andrew M Tecco
*Assistant Examiner* — Praachi M Pathak
(74) *Attorney, Agent, or Firm* — J. Michael Neary

(57) ABSTRACT

A shipping method includes the steps of receiving stacks of flat die cut corrugated paperboard blanks from a corrugator or sheet plant; loading the stacks of blanks into a pallet assembly machine; folding the blanks together in the assembly machine to produce a corrugated paperboard pallet; and providing the pallets for shipping items to a receiver. The assembly machine folds the blanks using intermittent motion of the blanks through multiple folding sections in the assembly machine. The sections operate by positioning, clamping and folding the blanks using levers that are supported by rotary bearings and driven by pinned end mounted pneumatic cylinders. The assembly machine overcomes misalignment and shifting of the stacks of blanks by picking up single blanks from the top of the stacks using vacuum, and adjusting alignment of the blanks after being picked up but prior to being fed into the first folding section of the assembly machine.

18 Claims, 9 Drawing Sheets

(56) References Cited

U.S. PATENT DOCUMENTS

| | | | | | |
|---|---|---|---|---|---|
| 4,650,448 | A * | 3/1987 | Urso | B31B 17/00 | 493/110 |
| 4,691,859 | A * | 9/1987 | Snyder | B65D 5/36 | 220/495.09 |
| 4,792,325 | A * | 12/1988 | Schmidtke | B31D 5/00 | 108/51.3 |
| 4,875,419 | A | 10/1989 | Helton et al. | | |
| 4,936,229 | A | 6/1990 | Parnell | | |
| 4,978,275 | A * | 12/1990 | Reid | B65G 57/11 | 198/419.1 |
| 5,114,392 | A * | 5/1992 | McAdam, III | B31B 1/36 | 493/179 |
| 5,199,845 | A * | 4/1993 | Hirashima | B65G 47/90 | 294/86.4 |
| 5,336,042 | A * | 8/1994 | Winski | B65B 11/585 | 206/386 |
| 5,355,575 | A * | 10/1994 | Self | B27M 3/0073 | 269/14 |
| 5,636,966 | A * | 6/1997 | Lyon | B65G 1/1378 | 414/789.6 |
| 5,769,413 | A * | 6/1998 | Hummel | B65H 31/3018 | 271/213 |
| 5,797,832 | A * | 8/1998 | Ong | B31C 1/00 | 108/51.3 |
| 6,029,582 | A | 2/2000 | Ogilvie et al. | | |
| 6,095,208 | A * | 8/2000 | Aguilar | B27B 33/08 | 144/133.1 |
| 6,116,568 | A | 9/2000 | Rosenblat et al. | | |
| 6,499,206 | B1 * | 12/2002 | Eure | B27M 3/0073 | 227/110 |
| 6,739,270 | B1 | 5/2004 | Sewell | | |
| 6,944,928 | B1 * | 9/2005 | Johansson | B65D 19/0026 | 29/430 |
| 7,007,613 | B2 | 3/2006 | Sketo | | |
| 7,234,402 | B2 | 6/2007 | Olvey et al. | | |
| 7,303,519 | B2 * | 12/2007 | Jenkins | B31D 5/00 | 493/128 |
| 7,426,890 | B2 | 9/2008 | Olvey | | |
| 7,472,474 | B2 | 1/2009 | Jaen | | |
| 7,484,343 | B2 | 2/2009 | Dickner | | |
| 7,980,184 | B2 * | 7/2011 | Olvey | B65D 19/0012 | 108/51.3 |
| 8,033,975 | B2 * | 10/2011 | Wiklund | B31B 1/36 | 493/182 |
| 8,261,675 | B2 | 9/2012 | Morris | | |
| 8,365,677 | B2 | 2/2013 | Olvey | | |
| 9,199,426 | B2 * | 12/2015 | de Koning | B31D 1/005 | |
| 2003/0126030 | A1 * | 7/2003 | Hungerford, III | G06Q 10/08 | 186/52 |
| 2010/0107933 | A1 * | 5/2010 | Love | B65D 19/0022 | 108/51.3 |
| 2013/0075459 | A1 * | 3/2013 | Willman | B65D 5/10 | 229/117 |
| 2015/0239609 | A1 * | 8/2015 | Olvey | B65D 19/0012 | 108/51.3 |

* cited by examiner

CORRUGATED PALLET SHIPPING METHOD

This is related to and claims priority for U.S. Provisional Application No. 61/664,827 filed on Jun. 27, 2012, and to U.S. Provisional Application No. 61/823,380 filed on May 14, 2013, and to PCT Application No. PCT/US13/00137 filed on May 20, 2013, all entitled “Corrugated Pallet”, and to U.S. Provisional Application 61/665,358 filed on Jun. 28, 2012 and entitled “Corrugated Paperboard Pallet Shipping Method”.

This invention pertains to shipping systems for transporting goods, and more particularly to a corrugated pallet shipping method that reduces direct and indirect costs for shipping. The shipping method reduces waste material and facilitates just-in-time palletizing with minimal pallet labor, storage, transport and uncertainty costs. The shipping method further enables high volume pallet production by uniquely providing complete machine assembly on site at a shipping facility.

BACKGROUND OF THE INVENTION

Shipping pallets are said to move the world. Eighty percent of commerce ships on shipping pallets. They are estimated at greater than a $30 B industry worldwide. More than 500 million pallets are manufactured in the US each year, with 1.8 billion pallets in service in the US alone.

Pallets can be made from various materials, however wood pallets currently comprise about 80% of the market. More than 40% of worldwide hardwood lumber currently goes to manufacture of wood pallets. Other materials used for pallet manufacture include plastic, metal and corrugated paperboard.

Recent regulations regarding infestation and contamination are creating a surge in interest and use of non-wood pallet alternatives. A small, but the fastest growing segment, is the use of corrugated paperboard pallets. There is a desire by many to replace conventional wooden pallets with corrugated pallets for increasing recyclability, lowering pallet weight, eliminating product contamination and reducing injuries. Despite the potential advantages of corrugated pallets, their use has not yet become mainstream. Significant deficiencies holding back their use have been too high costs and an inherent inability to be able to readily produce and distribute them in sufficiently high volume.

In both private and public industries, it is desirable to be able to ship items with reduced total costs. Currently, shipping pallets require extensive storage space, significant logistical costs as well as injury and product damage uncertainty costs. A new shipping method is needed to facilitate shippers to easily and reliably ship items in high volume and with the lowest possible total cost.

SUMMARY OF THE INVENTION

The invention uniquely enables corrugated material-pallets to be produced and utilized in high volume. The invention reduces the material costs and the logistics costs for utilizing corrugated material pallets. It lowers storage space requirements and provides greater ease of use than shipping with today’s shipping pallets. It further provides the ability for eliminating pallet transportation and intermediate assembly steps, significantly reducing total shipping costs. The invention provides the ability to completely assemble corrugated material-pallets by a machine that is sufficiently small and reliable enough that it can be placed and operated directly at a shipper’s facility.

Typically, corrugated material pallets are produced at pallet manufacturers by corrugated paperboard being shipped to the pallet manufacturer and the pallet manufacturer shipping completed pallets or pallet parts to a product shipper for use. This method is similar to that utilized by the wood pallet industry. Unfortunately, it requires a large number of pallet manufacturing sites and it adds substantial logistics costs.

It would be very desirable to ship corrugated material directly from existing and already widespread corrugators or sheet plants to product shippers, who would assemble the pallets on site, without the added transportation, handling, assembly and overhead costs of a separate pallet manufacturer. Unfortunately, to date corrugated material pallets have not been designed for easy onsite assembly. Most require some hand assembly, making it difficult to meet volume requirements, and/or utilize very large and complex assembly machinery. Some conventional machines for folding corrugated material are as much as 100 feet long, depending on steps. To enable assembly at a shipper’s site, a pallet assembly machine would need to be extraordinarily reliable and preferably compact enough to occupy less than 500 square feet.

In the corrugated material folding industry, it is well known in the art to fold material by continuous moving of the material and utilizing sloping guides that cause folding to occur as the material moves over a distance. This method is simple and reliable and can be very high speed of one per second or faster. Unfortunately, this method of folding material usually requires an extensive length in the folding machinery. We have found that the application of onsite assembly of corrugated material pallets has unique requirements. The pallet assembly machinery cannot be exceedingly long and most preferably is as compact as possible. Likewise, due to the speed capability of loading pallets, pallets are not required to be assembled at a high rate of one pallet a second. One pallet every 30 seconds or even one pallet per minute is adequate in most cases. These unique requirements dictate the development of a unique new machine for folding corrugated material pallets.

The invention provides a shipping method that comprises receiving stacks of flat die cut corrugated material blanks from a corrugator or sheet plant. The stacks of blanks are loaded into a pallet assembly machine preferably occupying a floor space of less than 500 square feet, wherein the pallet assembly machine folds the blanks together and produces a corrugated material pallet and the pallets are provided for shipping items to a receiver. The pallet machine folding the blanks uses intermittent motion of the blanks, and the pallet assembly machine includes multiple folding sections, such that the sections operate by positioning, clamping and folding the blanks. In one embodiment, the pallet assembly machine overcomes misalignment and shifting of the stacks of blanks by picking up the blanks from the top of the stacks using vacuum and adjusting alignment of the blanks after picked up but prior to being fed into the first folding section of the pallet assembly machine.

It is preferable to drop ship stacks of blanks from a corrugator or sheet plant, i.e. a producer with a die cutting machine to produce the die cut blanks. The stacks of blanks need to be fed into the pallet assembly machine which precisely folds the blanks. We have found that shipment of stacks of blanks undergoes shifting during transport to a location with the pallet assembly machine. This shifting could be overcome by hand stacking and loading the blanks individually into the pallet assembly machine. However, this is not practical or cost effective. The pallet assembly machine overcoming misalignment and shifting of blanks after it picks up a blank and prior to being fed into the machine has been found to be a very effective solution to achieving reliable pallet assembly despite misaligned stacks of blanks.

To facilitate operation of the pallet assembly machine with downtime for reloading, and to provide stacks of blanks that are easy to transport and reload into the assembly machine, we have found that it is preferable to have stacks of approximately 180 blanks. In an additional embodiment of the invention, the stacks of blanks comprise between 80 and 280 blanks and the loading into the pallet assembly machine is done with a fork lift. Loading of blanks into the pallet assembly machine with a fork truck as opposed to a pallet jack allows more easy and accurate initial alignment of the stack. This is because fork lifts typically have a side shift capability whereas a pallet jack needs to be maneuvered accurately in two directions at the same time.

In another embodiment, the stacks of blanks are shipped to the location of the pallet assembly machine on slip sheets as opposed to pallets. This provides several benefits. The blanks maintain full length support during shipping are not subjected to bending and bowing so that the blanks travel and are folded more reliably in the pallet assembly machine. Secondly, the omission of a pallet prevents catching of the bottom blank or blanks on protruding nails or wood slivers that may be in a wooden pallet. Thirdly, many cardboard boxes are shipped this way and forklift drivers have experience moving stacks of corrugated material by this method.

Although the assembly of pallets may be located at an intermediate facility such as a local pallet producer for the purpose of providing pallets to many smaller users, the greatest cost savings advantage is achieved by locating the pallet assembly machine directly at a shipper's facility. This eliminates middleman logistics costs and allows just-in-time pallet production. In a further embodiment of the invention, the pallet assembly machine is located at a shipper and provides corrugated material pallets to a palletizer based on a signal from the palletizer. The pallet assembly machine can uniquely be linked to a palletizer such that it produces pallets for a palletizer whenever required or whenever the palletizer is not full.

One of the ways that adjusting alignment of blanks by the pallet assembly machine can be accomplished is by providing mechanical support for the blanks after they are picked up. In yet an additional embodiment of the invention, the adjusting alignment of the blanks is accomplished by the pallet assembly machine providing support for the blanks from at least two sides, releasing the vacuum and shifting the blanks laterally. A blank is picked up by vacuum, supports moved underneath, vacuum released so that the blank is supported loosely, free to be aligned. Positioners then can align the blank prior to being fed into the first folding section, such that no jamming or inaccurate folding occurs.

It is desirable for the pallet assembly machine to operate for millions of cycles with little or no maintenance, preferably at a shipper's facility where it must be counted upon. In an additional embodiment, the folding of the blanks uses levers which are supported by rotary bearings and driven by pinned end mounted pneumatic cylinders. To achieve such high cycle life and reliability, we have found that the machine preferably conducts folding with the use of lubricated for life rotary bearings. Although many motions may require linear or near linear motion, more easily supported by linear bearings, the life of operation can be greatly extended through the support of motions using rotary bearings and levers that approximate linear motion. Linear bearings force lubrication out of the bearing with every motion either direction. In contrast, the pallet assembly machine of the invention maintains lubrication for life by use of rotary bearings to support motions, which maintain lubrication from contained rotary motion. Likewise, actuation of motions is preferably powered by pneumatic cylinders for high cycle life and the cylinders are mounted to eliminate bending. The motions are preferable driven by pinned end mounted pneumatic cylinders. Without bending; lubricated for life pneumatic cylinders can achieve a reliable travel life of 500-3000 miles with an average of typically 1500 miles. In the construction of the pallet machine with most cylinders having a relatively modest stroke, this results in a reliable cycle life of millions of cycles.

The folding of blanks into pallets requires both reliable mechanical construction, but also reliable control. It is well known in the design of mechanical machinery to include sensors for feedback about motions to a controlling computer or programmable logic controller. This is particularly important in machines where motion times can vary. Because of the use of rotary bearings for machine motions, lubrication of the bearings stays constant and friction of the bearing remains constant and low. Likewise, pneumatic cylinders without bending also have relatively constant actuation. Because of these facts, we have found that it is possible to have simplified and increased reliability through time based open loop control. In a further embodiment of the invention, the pallet assembly machine folds the blanks using mechanical stops for the machine motions in conjunction with a computer providing time based open loop control. The computer or programmable logic controller needs only to actuate solenoid valves that control pneumatic cylinders driving the motions in a programmed sequence. The time for each solenoid activation is preferably set to be 25-100% longer than the physical time required for the motion. In operation, a motion is activated and the motion moves to final position, which is set by a mechanical stop. Some additional dwell time is included for certainty and then the next motion is activated. The required time to assemble a pallet is unfortunately longer than necessary because of the use of dwell time versus closed loop feedback sensors. However, the machine is greatly simplified and reliability is increased through the omission of as many as 100 sensors or more, that otherwise could or become out of adjustment.

Of critical importance at shipping facilities is the use of floor space. Because of the intermittent motion folding of the pallets, the pallet assembly machine can be made very compact. In yet an additional embodiment, the folding sections have a total combined floor area of less than 500 square feet. More preferably, the folding sections have a combined floor area of less than 300 square feet.

The design of the corrugated pallet must be matched with the design of the pallet assembly to provide the benefits of the shipping method. We have found that these benefits are best achieved by utilizing a corrugated pallet that is constructed from two flat blanks. In an additional embodiment, the corrugated material pallets are constructed from two different blanks which form the pallet top and the pallet bottom, and the pallet assembly machine comprises three sections that fold the pallet top, fold the pallet bottom, and fold the pallet top and the pallet bottom together.

DESCRIPTION OF THE DRAWINGS

The invention and its many advantages and features will become better understood upon reading the following detailed description of the preferred embodiments in conjunction with the following drawings, wherein.

DESCRIPTION OF THE PREFERRED EMBODIMENT

Figure 2:
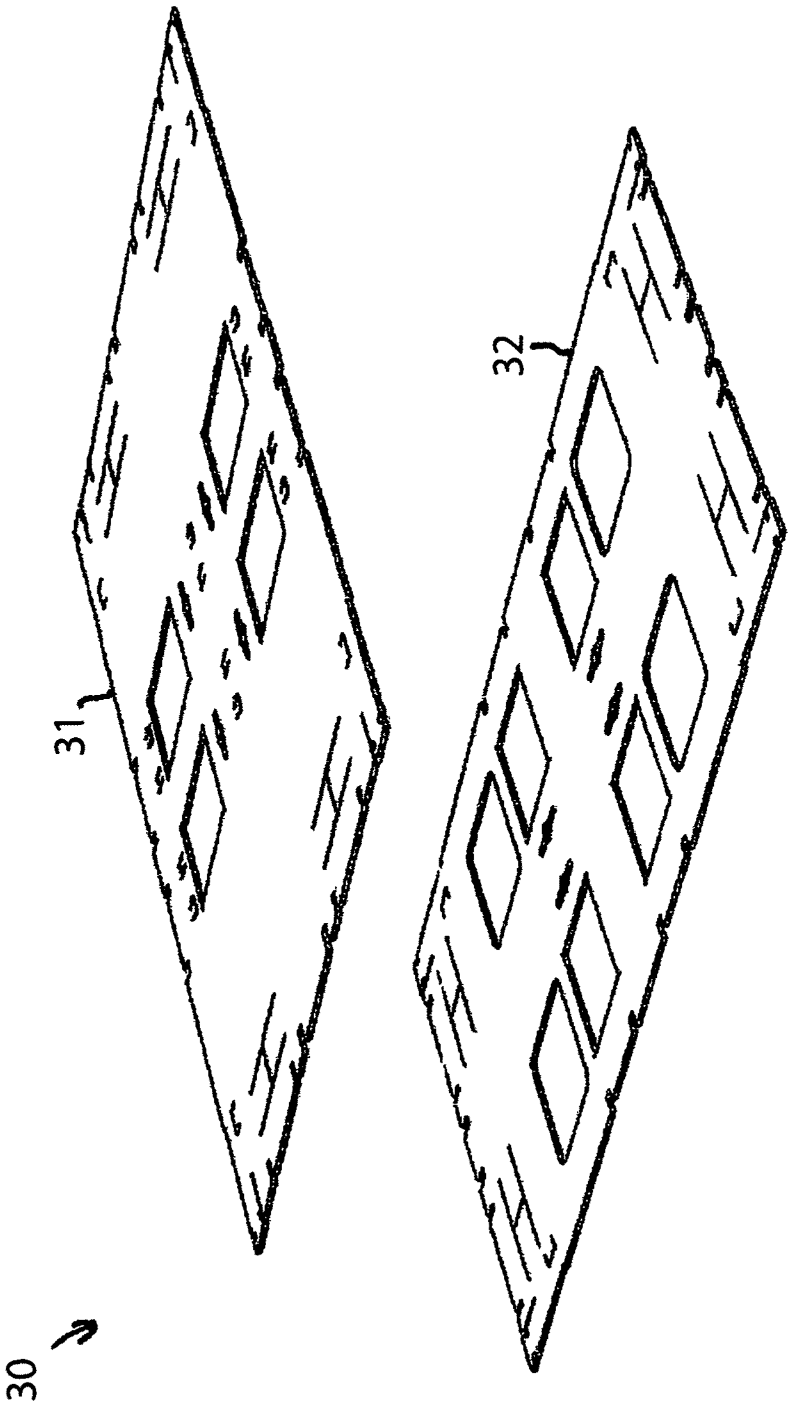
FIG. 2 is a schematic drawing of the corrugated paperboard pallet of FIG. 1 in flat blanks state for use in the shipping method in accordance with the invention.
Figure 3:
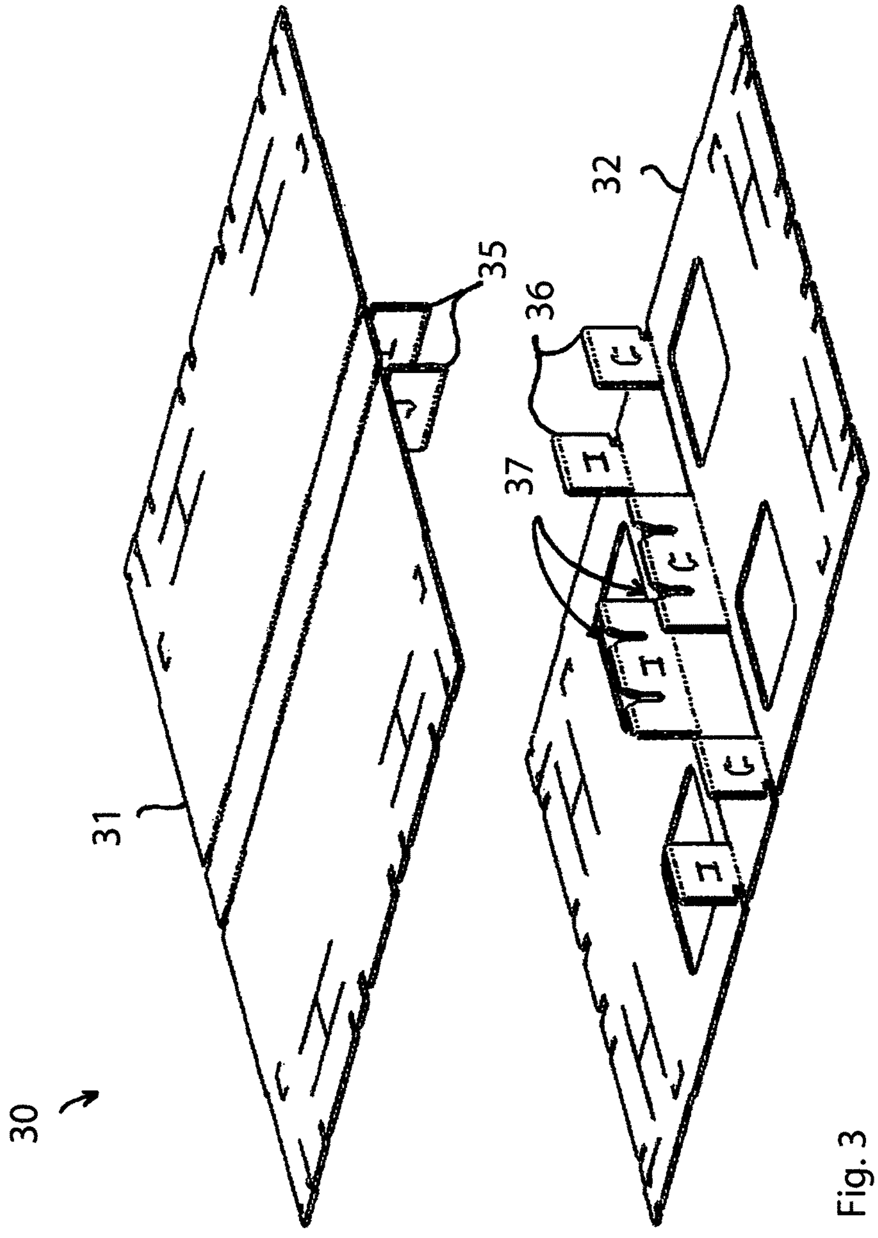
FIG. 3 is a schematic drawing of the corrugated paperboard pallet of FIG. 1 in folded top and bottom state for use in the shipping method in accordance with the invention.
Figure 4:
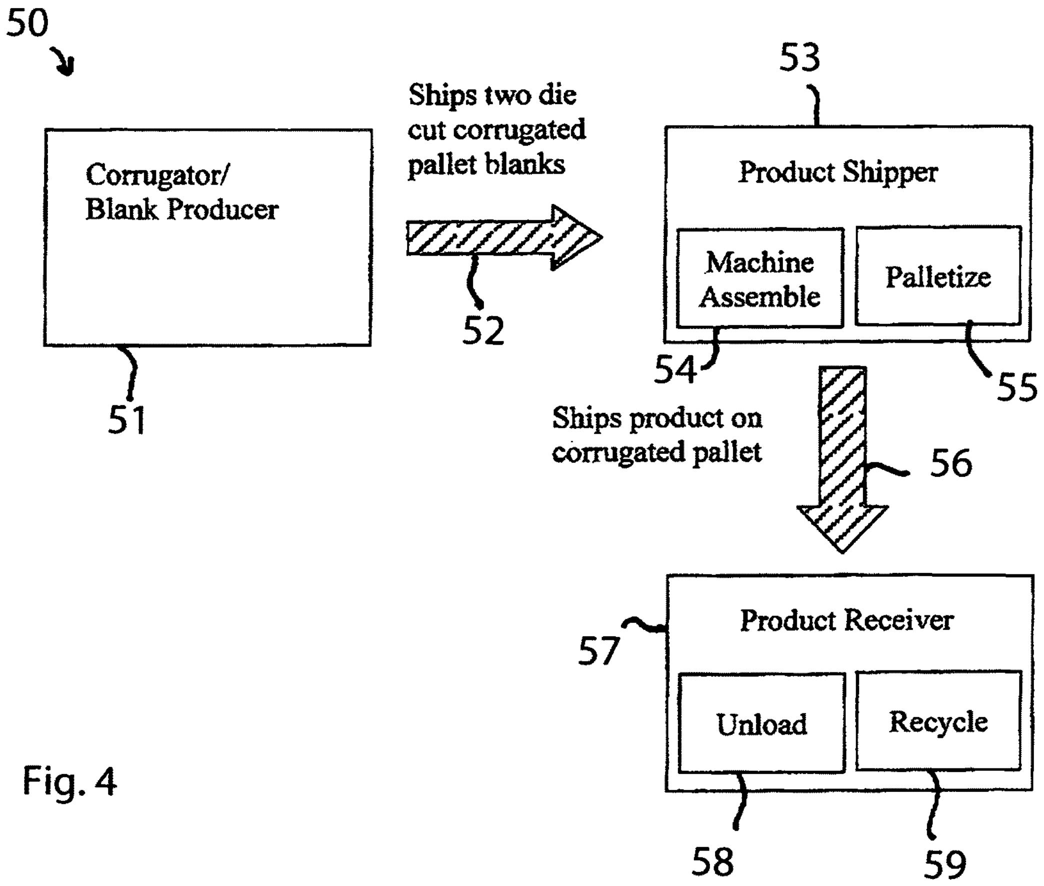
FIG. 4 is a schematic flow diagram of a corrugated paperboard pallet shipping method in accordance with the invention.
Figure 5:
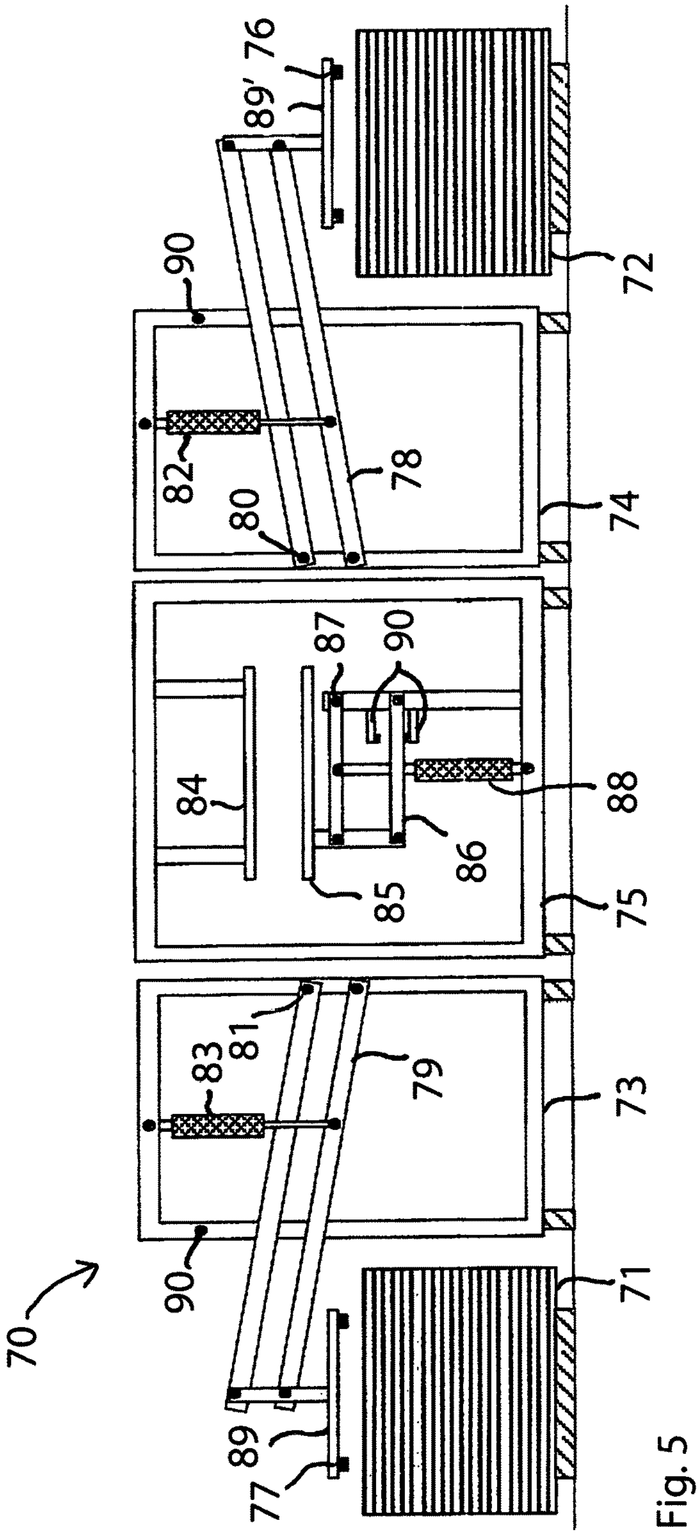
FIG. 5 is a schematic drawing of a corrugated paperboard pallet assembly machine in accordance with the invention.
Figure 7:
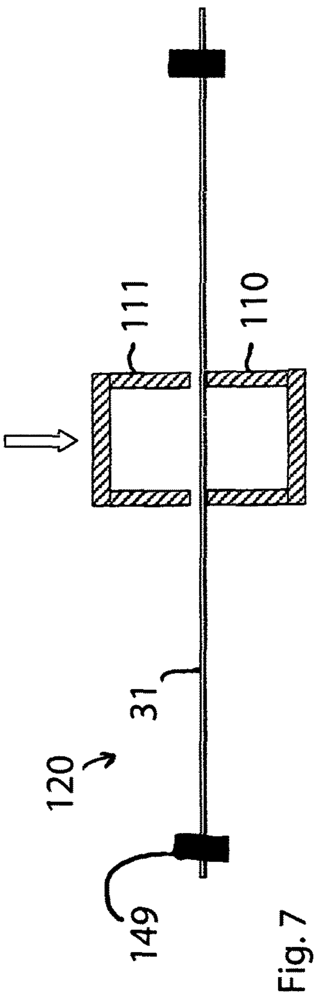
FIG. 7 is a schematic diagram of the blank clamping in a folding section of a corrugated paperboard pallet assembly machine in FIG. 5 in accordance with the invention.
Figure 8:
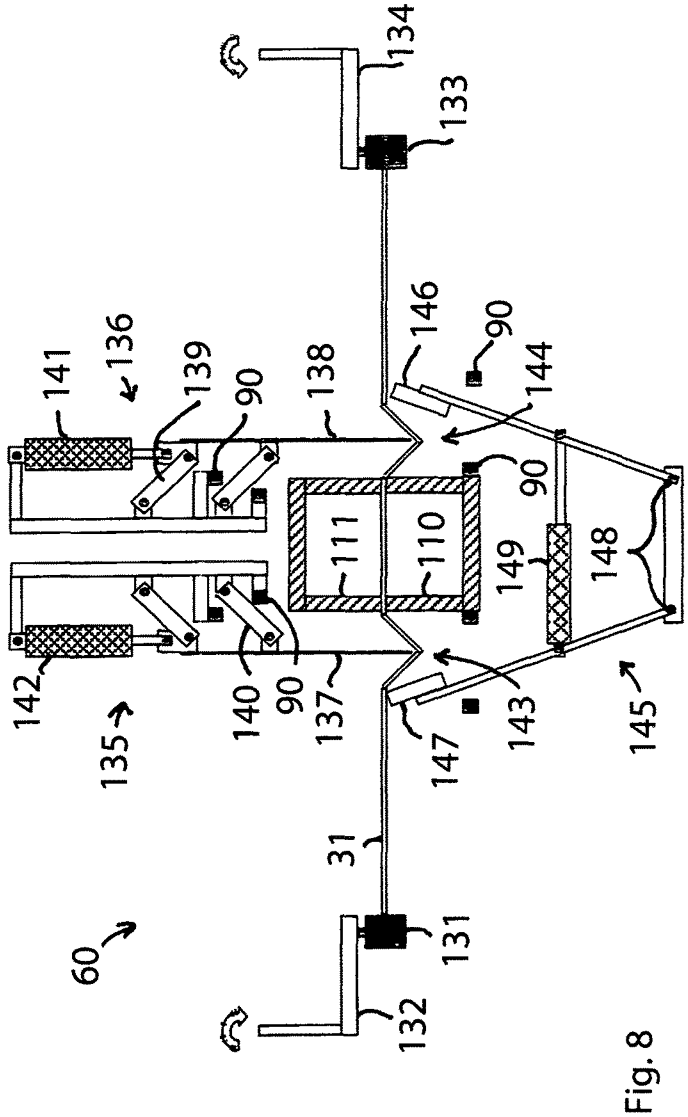
FIG. 8 a schematic diagram of the rib folding in a folding section of a corrugated paperboard pallet assembly machine in FIG. 5 in accordance with the invention.

Turning to the drawings, wherein like reference characters designate identical or corresponding parts, FIG. 4 shows a flow diagram of a corrugated material pallet shipping method in accordance with the invention. The disclosed preferred embodiment uses the machine to produce corrugated paperboard, but other corrugated materials could be used instead. The shipping method 50 comprises a corrugator or sheet plant 51 where corrugated pallet blanks 31, 32 are produced and shipped in stacks to a product shipper 53. The blanks 31, 32, such as those illustrated in FIG. 2, comprise stacks 71, 72 of top and bottom die cut corrugated pallet blanks 31, 32, sent to the product shipper in step 52. The product shipper 53 has a facility with a pallet assembly machine 54 for producing new pallets from corrugated paperboard blanks 31, 32 sent from the corrugator 51, and a palletizer 55 for palletizing products on the assembled pallets 30. The product shipper 53 takes the pallet blanks 31, 32 and utilizes the pallet assembly machine 54 (shown in more detail in FIG. 5) to produce recyclable corrugated pallets 30. The corrugated pallets 30 are loaded by the product shipper 53 utilizing the palletizer 55. The product on corrugated pallet 30 is shipped in step 56 from the product shipper 53 to the product receiver 57. At the product receiver 57, the product on corrugated pallet is unloaded in step 58 and the corrugated pallet is recycled in step 59. There is no need for the product shipper to store pallets to facilitate shipping, nor does the product shipper need a massive facility and infrastructure to produce wood pallets just-in-time. Pallets are made available to the product shipper exactly when needed. Tracking of the pallets after shipping product to the product receiver is also no longer necessary as the pallets are uniquely recycled after one time use A schematic diagram of a corrugated paperboard pallet assembly machine 54 for use with the shipping method of FIG. 4 is shown in FIG. 5. The pallet assembly machine 54 preferably takes up a minimal amount of space, preferably less than 600 square feet and to accomplish this, discontinuous motion of the corrugated paperboard was surprisingly found to be the solution. Contrary to teaching in the art of corrugated manufacturing, we have found that discontinuous or intermittent motion of corrugated material is desirable in this application. As a downside, the assembly machine requires steps for material registration due to stopping and also increased assembly time. However, we have found that this method can be utilized to dramatically reduce floor space required for the pallet assembly machine in lieu of a significantly shorter assembly time. We have also found that the longer assembly time with discontinuous motion is still adequately short enough to meet the time necessary for palletizing by a downstream palletizer even if up to three palletizers are fed per assembly machine in most cases. The pallet assembly machine 54 takes in top blanks 31 from the stack 71 into a pallet top former 60 and takes in bottom blanks 32 into the pallet bottom former 62 (shown schematically in FIG. 9). Ribs 35, 36 are folded in the blanks top and bottom blanks 31, 32 as shown in FIGS. 7 and 8, and the blanks 31, 32 are joined by nesting the notches 37 in the ribs 35, 36 into each other in a top and bottom joiner 75 which assembles and folds together the pallet tops and pallet bottoms to form finished pallets 30. The pallet assembly machine 54 is operated by a control 161 that comprises a controller 162 and solenoid valves 163. A compressor 164 feeds air under pressure to the control 161 that operates the pallet top former 60, pallet bottom former 62 and pallet top and bottom joiner 55. In one preferred embodiment, the pallet assembly machine 50 comprises open loop pneumatic control for reliability and low costs. In the pallet top former 52 is the initial step of registration 61 to insure proper location and operation on the top blanks 51. In the pallet bottom former 54 is the initial step of registration 63 to insure proper location and operation on the pallet bottom blanks 53. In the top and bottom joiner 55, the initial step is also registration 62.

Figure 10:
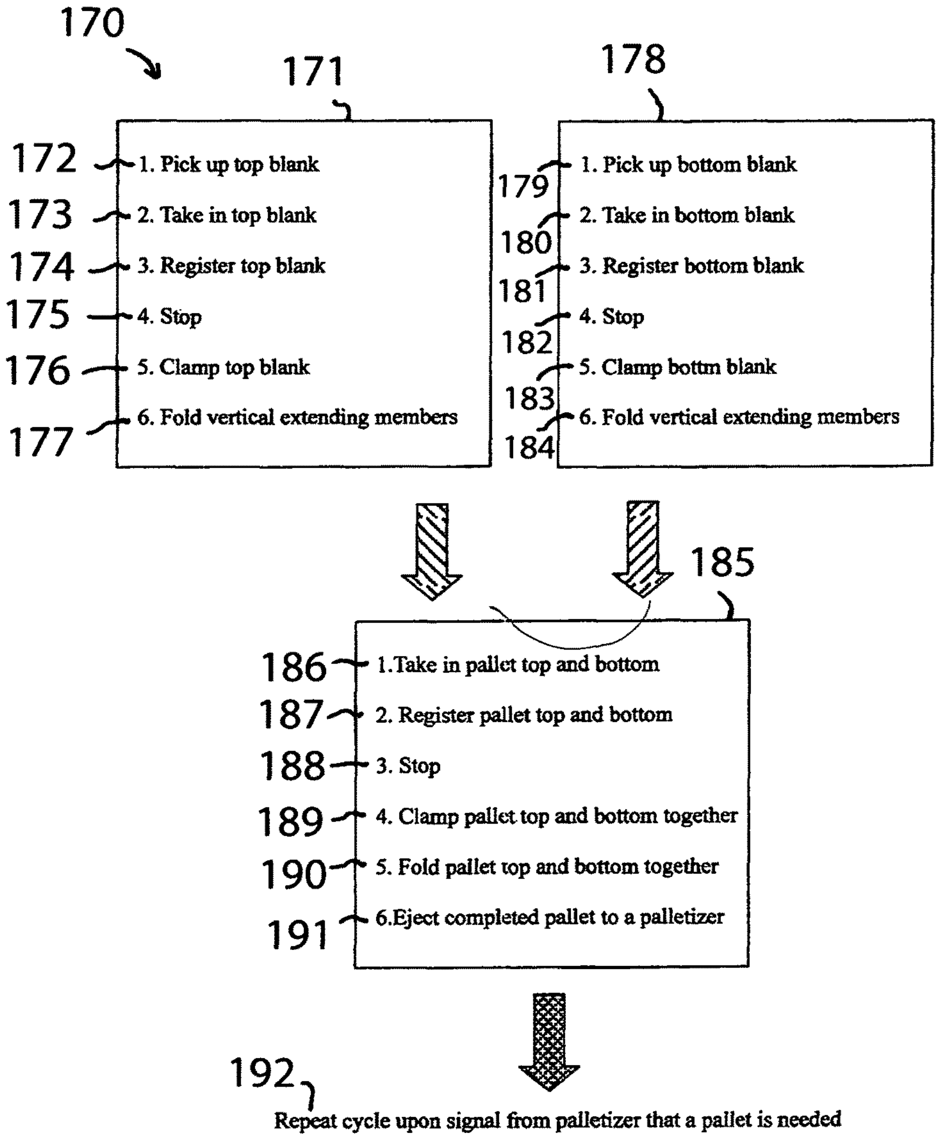
FIG. 10 a schematic diagram of a machine process for use with a corrugated paperboard pallet production machine in FIG. 5 in accordance with the invention.

A schematic diagram of a machine process for use with a corrugated paperboard pallet production machine of FIG. 5 is shown in FIG. 10. The process comprises three sections, the pallet top forming 171 performed by the pallet top former 60, pallet bottom forming 178 performed by the pallet bottom former 62, and the pallet top and bottom joining 185 performed by the pallet top and bottom joiner 64. The three sections 60, 62, 64 perform their respective steps of the process, as shown in FIG. 10, to form a completed pallet 30.

The pallet top former 60 performs the following steps: Step 172—picking up the top blank 31 off the top of the stack 71. Step 173 —loading the top blank onto taking in the top blank 84, registering the location of the top blank 85, stopping motion of the corrugated blank 86, clamping the top blank 87 and folding the vertically extending members 88 on the top blank. The pallet bottom former comprises the steps of picking up the bottom blank 89, taking in the bottom blank 90, registering the location of the bottom blank 91, stopping motion of the corrugated blank 92, clamping the bottom blank 93 and folding the vertically extending members 94 on the bottom blank. The pallet top and bottom joiner comprises the steps of taking in the pallet top and bottom 95, registering the location of the pallet top and bottom 96, stopping the motion of the corrugated pallet top and bottom 97, clamping the pallet top and bottom together 98, folding the pallet top and bottom together 99 and ejecting the completed pallet to a palletizer 100. After each cycle, the pallet assembly machine repeats the cycle 101 upon signal from the palletizer that a pallet is needed.

Figure 1:
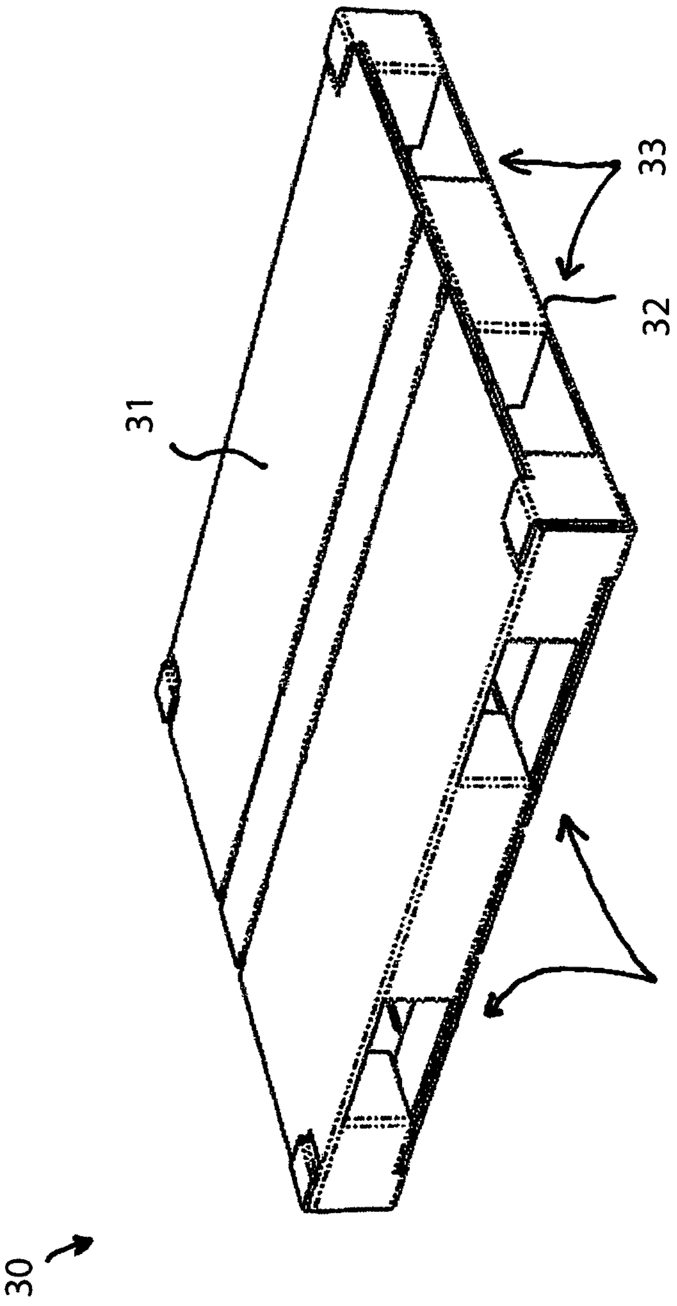
FIG. 1 is a schematic drawing of a completed corrugated paperboard pallet for use in the shipping method in accordance with the invention.

A schematic drawing of corrugated paperboard pallet flat blanks for use in the shipping method of FIG. 1 is shown in FIG. 4. The corrugated pallet 110 is formed from two flat die cut corrugated blanks 111, 112. These blanks may be of different corrugation configurations. For instance, we have found that B-C flute is desirable for both with the C side at the pallet top and bottom A schematic drawing of a corrugated paperboard pallet 110 with folded pallet bottom 111 and folded pallet bottom 112 aligned for compression assembly together is shown in FIG. 5. The pallet bottom 111 has vertically extending ribs 113 and the pallet top 112 has vertically downward extending ribs 114. The top pallet ribs 114 and bottom pallet ribs 113 intersect to form the rigid and reliable pallet load support.

Figure 6:
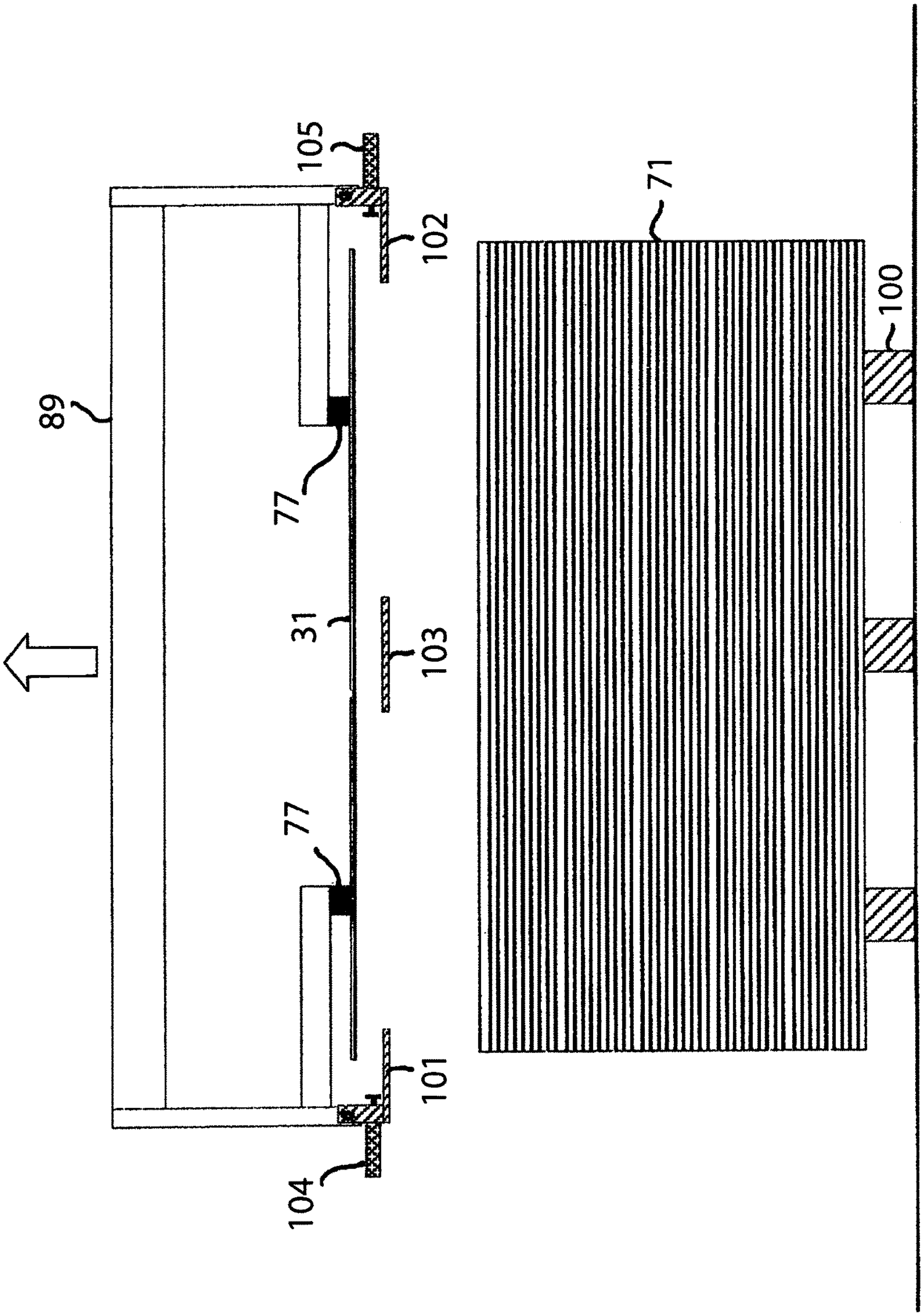
FIG. 6 is a schematic drawing of the blank loading section of a corrugated paperboard pallet assembly machine in FIG. 5 in accordance with the invention.

A schematic drawing of completed corrugated paperboard pallet for use in the shipping method of FIG. 1 is shown in FIG. 6. The pallet 110 comprises a pallet bottom 111 and a pallet top 112. Once folded into complete assembly, the pallet 110 preferably has fork holes 115, 116 for entry in all four directions.

A schematic diagram of corrugated paperboard pallet shipping method in accordance with the invention is shown in FIG. 4. The shipping method 50 comprises shipping corrugated paperboard blanks 52 from a corrugator or blank producer 51 to a product shipper 53. Blanks are produced by die cutting corrugated paperboard and this can typically either be done by a corrugator or a sheet plant. The product shipper 53 does both pallet assembly 54 and a palletizing 55. The blanks 52 are loaded into the pallet assembly machine which assembles pallets 54 in response to a signal from the palletizer that palletizes. The palletizer then loads the shipping items or products on to the corrugated paperboard pallet. The product shipper 53 ships product 56 to a product receiver 57. The product receiver 57 unloads 58 the product and recycles 59 the corrugated paperboard.

A schematic drawing of a corrugated paperboard pallet assembly machine in accordance with the invention is shown in FIG. 5. The pallet assembly machine is preferably designed to operate for millions of cycles reliably with little or no maintenance. We have found that a way to accomplish this goal is to utilize rotary bearings, which retain lubrication for life, in conjunction with levers and actuated by pinned end mounted pneumatic cylinders. The pallet assembly machine 70 creates pallets from two stacks of corrugated paperboard blanks 71, 72. The blanks 71, 72 form the pallet top 31 and pallet bottom 32 by being folded in the pallet top folding section 73 and pallet bottom folding section 74 using apparatus shown in FIG. 8 in each of sections 73 and 74 (not shown in FIG. 5 for clarity of illustration.) The pallet top and pallet bottom are then folded together in the joining section 75 to produce a finished pallet. The pallet top folding section 73 and pallet bottom folding section 74 each pick up blanks 71, 72 using vacuum suction cups 76, 77 attached to the feed head frames 89, 90. The blanks 71, 72 are then preferably aligned before being fed into the folding sections 73, 74 to provide for accurate feeding and folding. The feed heads 89, 90 are raised by lift arms 78, 79 that are supported by rotary bearings 80, 81. The arms 78, 79 are driven by pneumatic cylinders 82, 83 that are mounted with pinned ends. Using pinned ends eliminated bending in the pneumatic cylinders and greatly extends cylinder life. An average travel life of 1500 miles can be expected which results in millions of cycles for most cylinders on the pallet assembly machine 70. After the ribs 35, 36 are formed in the pallet top 31 and pallet bottom 32, the pallet top and pallet bottom are moved into the joining section 75. The pallet top 31 and pallet bottom 32 are positioned to align vertically and then are clamped together by upper and lower platens 84 and 85. The lower platen 85 moves vertically by swing arms or levers 86 that are supported by rotary bearings 87 and driven by a pneumatic cylinder 88. After the pallet top 31 and pallet bottom 32 are clamped together, the pallet assembly machine 70 folds the sides and then ejects the completed pallet 30.

To ensure accurate and reliable folding of the corrugated paperboard pallets, the blanks 71, 72 must be fed into the folding sections 73, 74 without jamming and must be positioned accurately. This is despite the fact that the stacks of blanks 71, 72 are not perfectly aligned and typically are shifted during transport. We have found that the most compact and reliable means to accomplish this goal is to pick up blanks from the top of the stacks using vacuum suction cups 76, 77 and then adjust alignment of the blanks after being picked up but prior to being fed into the first folding section of the pallet assembly machine. A schematic elevation of the blank loading section of a corrugated paperboard pallet assembly machine in FIG. 5 in accordance with the invention is shown in FIG. 6. The feed head 89 picks up a blank 31 from the top of the stack of blanks 71. The stack of blanks 71 is preferably shipped on a slip sheet, bottom of stack, and loaded into the pallet assembly machine 70 by use of a fork lift. The fork lift sets the blanks 71 on bank supports 100.

The feed head 89 picks up the blank 31 and supports 101, 102 and 103 are moved under the blank 31. The vacuum 77 is then released such that the blanks rest freely on mechanical supports 101, 102, 103. Side pneumatic cylinders 104, 105 are actuated, which centers and aligns the blank 31 on the supports 101, 102, 103 for proper feeding by a pair of scissor arms (not shown) into the clamp 110, 111 of the first folding section 60, shown in FIG. 8. The first folding section actually resides in section 73, but is shown separately in FIG. 8 for clarity of illustration.

A schematic elevation of the blank clamping in a folding section of a corrugated paperboard pallet assembly machine in FIG. 5 in accordance with the invention is shown in FIG. 7. The blank 31 is moved/into the fold section 73, then clamped between upper and lower clamp bars 110, 111.

The rib folding in a folding section of a corrugated paperboard pallet assembly machine in FIG. 5 in accordance with the invention is shown in FIG. 8. The rib folding is done after the blank is clamped. The rib folding on the top blank 31 is performed by the apparatus shown in FIG. 8 and located in section 73 of the machine shown in FIG. 5. The rib folding on the bottom blank 32 is performed by the apparatus shown in FIG. 8 and located in section 74 of the machine shown in FIG. 5.

Rib folding is initiated by outer side rollers 131, 133 mounted on levers 132, 134 that are moved inward to press inward on the edges of the blank 31 while breaker bar mechanisms 135, 136 are actuated to contact the blank 31 with breaker bars 137, 138 and fold the blank 31 at the desired position and in the correct rib folding directions 143, 144. The breaker bars 137, 138 are mounted on levers 139, supported by rotary bearings 140 and are moved by pinned end pneumatic cylinders 141, 142. Once the fold is started in the blank 31 in the correct rib directions 143, 144, rib compression bars 146, 147 are moved inward to squeeze the two sides of the blank forming the rib 35 against the sides of the lower clamp body 110 to form the ribs 35. The rib compression mechanism 145 is driven by a pneumatic cylinder 149 with the motion supported by rotary bearings 148.

Figure 9:
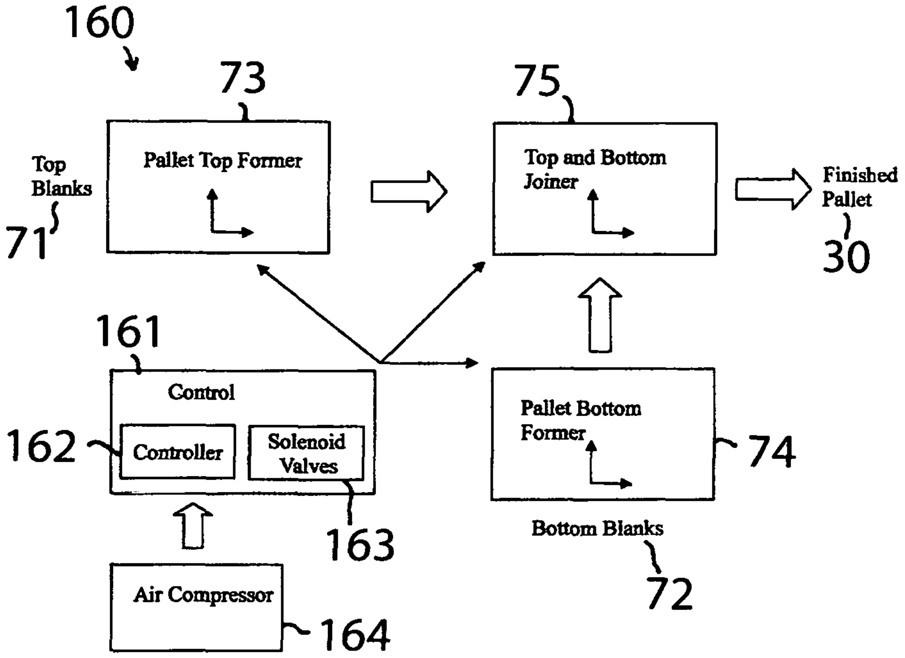
FIG. 9 is a schematic flow diagram of the control and operation of a corrugated paperboard pallet assembly machine in FIG. 5 in accordance with the invention.

A schematic diagram of the control and operation of a corrugated paperboard pallet assembly machine in FIG. 5 in accordance with the invention is shown in FIG. 9. The control 160 folds corrugated pallets 30 by taking in top blanks 31 into a pallet top former or folder 60 and forming the ribs 35. The control 160 also takes in bottom blanks 32 into a pallet bottom former or folder 62 and forms ribs 36. The pallet top 31 and pallet bottom 32 are then fed into the top and bottom joining section 75 where the top and bottom joiner 64 folds them together and produces a finished pallet 30. The pallet assembly machine is driven by air pressure from an air compressor 164 that provides pressure to solenoid valves 163 in the control section 161. The solenoid valves 163 are electrically actuated by a controller 162 which may comprise a computer or programmable logic controller. The controller 162 preferably controls the pallet assembly machine by time based open loop control wherein the solenoid valves for each motion are activated for set time periods longer than physically required by the respective motions. The motions move to mechanical stops 90 for reliably positioning and folding.

The steps to fold the corrugated paperboard pallet are a function the pallet design. A step diagram of a machine process for use with a corrugated paperboard pallet production machine in FIG. 5 in accordance with the invention is shown in FIG. 10. The pallet assembly machine steps 170 comprise pallet top folding steps 171, pallet bottom folding steps 178 and top and bottom joining steps 185. The pallet top folding steps 171 include: Step 172—picking up a blank 31 from the stack 71; Step 173—supporting the blank 31 freely on supports 101, 102, 103; Step 174 —registering or positioning the blank in position to be transferred into the rib folding station 60; Step 175—stopping motion of the blank with edge stops 149; Step 176—clamping the top blank 31 between top and bottom clamp sections 110 111; Step 177—folding the vertically extending members or ribs 35.

The pallet bottom folding steps 178 include: Step 179—picking up a blank 32 from the stack 72; Step 180—supporting the blank 32 freely on supports 101, 102, 103; Step 181 —registering or positioning the blank 32 in position to be transferred into the rib folding station 62; Step 182—stopping motion of the blank; Step 183—clamping the bottom blank 132 between top and bottom clamp sections 110 111; and Step 184—folding the vertical extending members or ribs 36.

The pallet top and bottom joining steps 185 include: Step 186—taking in the pallet top 31 and pallet bottom 32; Step 187—registering or positioning the pallet top 31 and pallet bottom 32 in position to be clamped together with the notches 37 in the ribs 36 nested into the notches in the ribs 35; Step 188—stopping motion of the pallet top and pallet bottom; Step 189—clamping the pallet top and pallet bottom together upper and lower platens 84 and 85; Step 190—folding the pallet top and bottom together; and Step 191—ejecting the completed pallet to a palletizer, when utilized. The steps 170 are repeated upon a signal from the palletizer in step 192 that a pallet is needed.

Obviously, numerous modifications and variations of the described preferred embodiment are possible and will occur to those skilled in the art in light of this disclosure of the invention.

Accordingly, I intend that these modifications and variations, and the equivalents thereof, be included within the spirit and scope of the invention as defined in the following claims, wherein I claim:

1. A shipping method comprising:

receiving stacks of flat die cut corrugated material blanks from a corrugator or sheet plant;

loading said stacks of said blanks into a pallet assembly machine;

said pallet assembly machine folding said blanks together and producing a corrugated material pallet;

providing said corrugated material pallets for shipping items to a receiver;

said pallet assembly machine folding said blanks using intermittent motion of said blanks and said pallet assembly machine comprising multiple folding sections wherein said sections operate by positioning, clamping and folding said blanks;

said pallet assembly machine overcoming misalignment and shifting of said stacks of said blanks by picking up said blanks from the top of said stacks using vacuum and adjusting alignment of said blanks after picked up but prior to being fed into the first folding section of said pallet assembly machine.

2. A shipping method defined in claim 1 wherein:

said stacks of said blanks comprising between 80 and 280 blanks and said loading into said pallet assembly machine being done with a fork lift.

3. A shipping method defined in claim 1 wherein:

said pallet assembly machine being located at a shipper and providing corrugated material pallets to a palletizer based on a signal from said palletizer.

4. A shipping method defined in claim 1 wherein:

said adjusting alignment of said blanks being accomplished by said pallet assembly machine providing support for said blanks from at least two sides, releasing said vacuum and shifting said blanks laterally.

5. A shipping method defined in claim 1 wherein:

said folding sections having a total combined floor area of less than 500 square feet.

6. A shipping method defined in claim 1 wherein:

said folding of said blanks using levers that are supported by rotary bearings and driven by pinned end mounted pneumatic cylinders.

7. A shipping method defined in claim 1 wherein:

said pallet assembly machine folding said blanks using mechanical stops for the machine motions in conjunction with a computer providing time based open loop control to solenoid valves that actuate said folding.

8. A shipping method defined in claim 1 wherein:

said corrugated material pallets being constructed from two different blanks which form the pallet top and the pallet bottom, and said pallet assembly machine comprising three sections that fold said pallet top, fold said pallet bottom, and fold said pallet top and said pallet bottom together.

9. A shipping method defined in claim 1 wherein:

said pallet assembly machine folding said blanks to form at least one rib extending out of plane of each of said blanks, said ribs of said top and bottom blanks extending perpendicular to each other and having aligned notches facing each other, said machine pressing said top and bottom blanks together so that said notches interlock and maintain said ribs in closed position and producing a corrugated material pallet.

10. A shipping method comprising:

receiving stacks of top and bottom flat die cut corrugated material blanks from a corrugator or sheet plant;

loading said stacks of said blanks into a pallet assembly machine; said pallet assembly machine folding said top and bottom blanks together and producing a corrugated material pallet;

providing said corrugated material pallets for shipping items to a receiver;

said pallet assembly machine folding said blanks using intermittent motion of said blanks and said pallet assembly machine comprising multiple folding sections to form said top and bottom blanks and assemble said folded top and bottom blanks together wherein said sections operate by positioning, clamping and folding said blanks;

said folding of said blanks accomplished using levers which are supported by rotary bearings and driven by pinned end mounted pneumatic cylinders;

said pallet assembly machine folding said blanks using mechanical stops for motions of said top and bottom blanks in conjunction with a computer providing time based open loop control to solenoid valves that actuate said folding.

11. A shipping method defined in claim 10 wherein:

said pallet assembly machine overcoming misalignment and shifting of said stacks of said blanks by picking up said blanks from the top of said stacks using vacuum and adjusting alignment of said blanks after being picked up but prior to being fed into a first folding section of said pallet assembly machine.

12. A shipping method defined in claim 11 wherein:

said adjusting alignment of said blanks being accomplished by said pallet assembly machine providing support for said blanks from at least two sides, releasing said vacuum and shifting said blanks laterally.

13. A shipping method defined in claim 10 wherein:

said folding sections having a total combined floor area of less than 500 square feet.

14. A shipping method defined in claim 10 wherein:

said stacks of said blanks being shipped to the location of said pallet assembly machine on slip sheets.

15. A shipping method as defined in claim 10, wherein said pallet assembly machine folding said blanks to form at least one rib extending out of plane of each of said blanks, said ribs of said top and bottom blanks extending perpendicular to each other and having aligned notches facing each other, said machine pressing said top and bottom blanks together so that said notches interlock and maintain said ribs in closed position and producing a corrugated material pallet.

16. A shipping method defined in claim 10 wherein:

said pallet assembly machine being located at a shipper and providing corrugated material pallets to a palletizer based on a signal from said palletizer.

17. A shipping method defined in claim 10 wherein:

said stacks of said blanks comprising between 80 and 280 blanks and said loading into said pallet assembly machine being done with a fork lift.

18. A shipping method defined in claim 10 wherein:

said corrugated material pallets being constructed from two different blanks which form the pallet top and the pallet bottom, and said pallet assembly machine comprising three sections that fold said pallet top, fold said pallet bottom, and fold said pallet top and said pallet bottom together.

* * * * *